July 10, 1962    G. LANGE ET AL    3,043,193
PHOTOGRAPHIC OBJECTIVE
Filed April 25, 1961
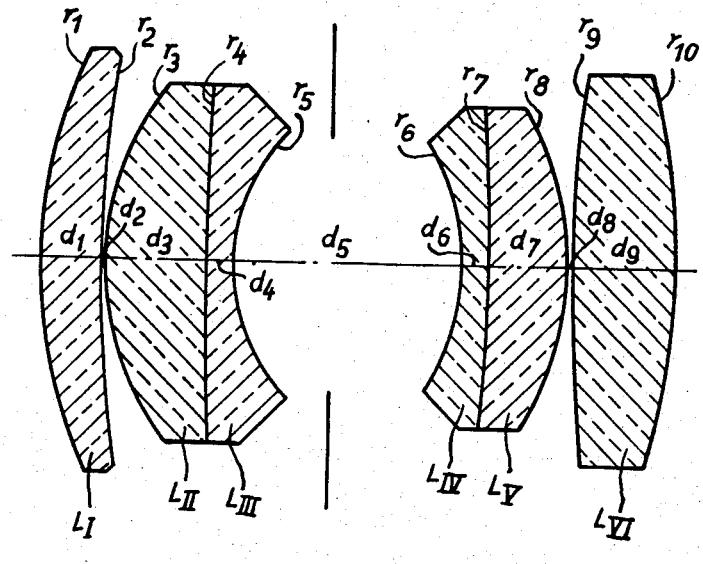

United States Patent Office 3,043,193
Patented July 10, 1962

3,043,193
PHOTOGRAPHIC OBJECTIVE
Günther Lange, Koenigsbronn, Wurttemberg, and Heinz Zajadatz, Aalen, Wurttemberg, Germany, assignors to Carl Zeiss, Heidenheim (Brenz), Wurttemberg, Germany
Filed Apr. 25, 1961, Ser. No. 105,513
Claims priority, application Germany June 29, 1960
1 Claim. (Cl. 88—57)

The present invention concerns a photographic objective consisting of two inner meniscus shaped dispersive compound members including between them the diaphragm and turning their concave sides towards the diaphragm, and of two outer simple collective lenses. In case a back focal length of about only $0.6 \cdot f$ and an image angle of about only $\pm 18°$ is wanted, a good compromise between the aberrations authoritative for the image if the objective is so designed that the following conditions are fulfilled in common:

(a) $0.52 \cdot f < D < 0.64 \cdot f$
(b) $0.7(r_3 - r_8) < D < 0.78(r_3 - r_8)$
(c) $0.75 \cdot f < (r_3 - r_8) < 0.85 \cdot f$
(d) $0.28 \cdot f < d_5 < 0.32 \cdot f$
(e) $0.5(r_5 - r_6) < d_5 < 0.55(r_5 - r_6)$
(f) $0.54 \cdot f < (r_5 - r_6) < 0.58 \cdot f$
(g) $0.75 \cdot f < B < 0.90 \cdot f$
(h) $0.15 \cdot f < (d_3 + d_4) < 0.20 \cdot f$
(i) $0.12 \cdot f < (d_6 + d_7) < 0.16 \cdot f$
(k) $1.00(r_5 - r_6) < D < 1.1(r_5 - r_6)$ (1) $0.24 \cdot f < r_5 < -r_6 < r_3 < -r_8 < r_1 <$
$-r_{10} < r_2 < r_9 < -r_7 < 3.0 \cdot f$ wherein are designated With $r_1 \ldots r_{10}$ the radii of the individual surfaces,
With $(d_3 + d_4)$ the thickness of the dispersive meniscus standing in front of the diaphragm,
With $d_5$ the diaphragm space,
With $(d_6 + d_7)$ the thickness of the dispersive meniscus standing behind the diaphragm,
With D the axial distance between the converging surfaces turned away from the diaphragm of the two dispersive menisci,
With B the overall length, and
With $f$ the focal length of the objective.

In the following the design data are given for an exemplary embodiment of an objective according to the invention, for which the accompanying drawing FIGURE shows the lens section. In the FIGURE and in the following table are designated With $L_I \ldots L_{VI}$ the lenses,
With $r_1 \ldots r_{10}$ the radii,
With $d_1 \ldots d_9$ the axial distances,
With $n_d$ the refractive numbers, and
With $\nu_d$ the Abbe-$\nu$-numbers.

The design data are normalized so that for the focal length there results the value $f = 1$. The aperture ratio of this example amounts to 1:2, the image angle to $\pm 18°$.

Table

| Lenses | Radii | Axial distances | $n_d$ | $\nu_d$ | surface refractive powers. $\Delta n/r$ |
|---|---|---|---|---|---|
| $L_I$ | $r_1 = +0.65859$ | | | | $+1.04832$ |
| | | $d_1 = 0.07902$ | 1.69042 | 54.80 | |
| | $r_2 = +1.60723$ | | | | $-0.42957$ |
| | | $d_2 = 0.00198$ | | | |
| $L_{II}$ | $r_3 = +0.38390$ | | | | $+1.59297$ |
| | | $d_3 = 0.13433$ | 1.61154 | 58.86 | |
| | $r_4 = +12.49388$ | | | | $-0.00213$ |
| $L_{III}$ | | $d_4 = 0.03556$ | 1.58495 | 40.65 | |
| | $r_5 = +0.25286$ | | | | $-2.31336$ |
| | | $d_5 = 0.29633$ | | | |
| | $r_6 = -0.30937$ | | | | $-2.18891$ |
| $L_{IV}$ | | $d_6 = 0.03951$ | 1.67718 | 32.26 | |
| | $r_7 = -2.38763$ | | | | $-0.00555$ |
| $L_V$ | | $d_7 = 0.10668$ | 1.69042 | 54.80 | |
| | $r_8 = -0.41256$ | | | | $+1.67349$ |
| | | $d_8 = 0.00198$ | | | |
| | $r_9 = +1.88293$ | | | | $+0.36667$ |
| $L_{VI}$ | | $d_9 = 0.13433$ | 1.69042 | 54.80 | |
| | $r_{10} = -0.89091$ | | | | $+0.77496$ |

Back focal length $s' = 0.604$

Within the scope of the present invention are included especially those objectives the design data of which approximate to close to the values to be taken from the foregoing table that none of the surface refractive powers $(\Delta n/r)$ deviates by more than $\pm 0.2 \cdot 1/f$ and none of the axial distances $(d)$ by more than $\pm 0.02 \cdot f$ from the respective value given in the table.

We claim:
Photographic objective consisting of two inner meniscus shaped dispersive compound members including between them the diaphragm turning their concave sides towards the diaphragm, and of two outer simple collective lenses characterized by the combination of the following features:

(a) $0.52 \cdot f < D < 0.64 \cdot f$
(b) $0.7(r_3 - r_8) < D < 0.78(r_3 - r_8)$
(c) $0.75 \cdot f < (r_3 - r_8) < 0.85 \cdot f$
(d) $0.28 \cdot f < d_5 < 0.32 \cdot f$
(e) $0.5(r_5 - r_6) < d_5 < 0.55(r_5 - r_6)$
(f) $0.54 \cdot f < (r_5 - r_6) < 0.58 \cdot f$
(g) $0.75 \cdot f < B < 0.90 \cdot f$
(h) $0.15 \cdot f < (d_3 + d_4) < 0.20 \cdot f$
(i) $0.12 \cdot f < (d_6 + d_7) < 0.16 \cdot f$
(k) $1.00(r_5 - r_6) < D < 1.1(r_5 - r_6)$ (1) $0.24 \cdot f < r_5 < -r_6 < r_3 < -r_8 < r_1 <$
$-r_{10} < r_2 < r_9 < -r_7 < 3.0 \cdot f$ wherein are designated With $r_1 \ldots r_{10}$ the radii of the individual surfaces,
With $(d_3 + d_4)$ the thickness of the dispersive meniscus standing in front of the diaphragm,
With $d_5$ the diaphragm space,
With $(d_6 + d_7)$ the thickness of the dispersive meniscus standing behind the diaphragm,
With D the axial distance between the converging surfaces turned away from the diaphragm of the two dispersive meniscus,
With B the overall length, and
With $f$ the focal length of the objective, and furthermore characterized in that its design values lie so close to the data given in the following table that none of the surface refractive powers $(\Delta n/r)$ differs absolutely by more than $0.2 \cdot 1/f$ and none of the axial distances ($d$) differs absolutely by more than $0.02 \cdot f$ from the corresponding value given in the table:

| Lenses | Radii | Axial distances | $n_d$ | $\nu_d$ | surface refractive powers, $\Delta n/r$ |
|---|---|---|---|---|---|
| $L_I$ | $r_1 = +0.65859 \cdot f$ | $d_1 = 0.07902 \cdot f$ | 1.69042 | 54.80 | $+1.04832/f$ |
|  | $r_2 = +1.60723 \cdot f$ | $d_2 = 0.00198 \cdot f$ |  |  | $-0.42957/f$ |
| $L_{II}$ | $r_3 = +0.38390 \cdot f$ | $d_3 = 0.13433 \cdot f$ | 1.61154 | 58.86 | $+1.59297/f$ |
| $L_{III}$ | $r_4 = +12.49388 \cdot f$ | $d_4 = 0.03556 \cdot f$ | 1.58495 | 40.65 | $-0.00213/f$ |
|  | $r_5 = +0.25286 \cdot f$ | $d_5 = 0.29633 \cdot f$ |  |  | $-2.31336/f$ |
| $L_{IV}$ | $r_6 = -0.30937 \cdot f$ | $d_6 = 0.03951 \cdot f$ | 1.67718 | 32.26 | $-2.18891/f$ |
| $L_V$ | $r_7 = -2.38763 \cdot f$ | $d_7 = 0.10668 \cdot f$ | 1.69042 | 54.80 | $-0.00555/f$ |
|  | $r_8 = -0.41256 \cdot f$ | $d_8 = 0.00198 \cdot f$ |  |  | $+1.67349/f$ |
| $L_{VI}$ | $r_9 = +1.88293 \cdot f$ | $d_9 = 0.13433 \cdot f$ | 1.69042 | 54.80 | $+0.36667/f$ |
|  | $r_{10} = -0.89091 \cdot f$ |  |  |  | $+0.77496/f$ |

Back focal length $s' = 0.604 \cdot f$

References Cited in the file of this patent
UNITED STATES PATENTS 2,831,397    Berger et al.    Apr. 22, 1958
2,936,675    Schade    May 17, 1960